1364514
1364515

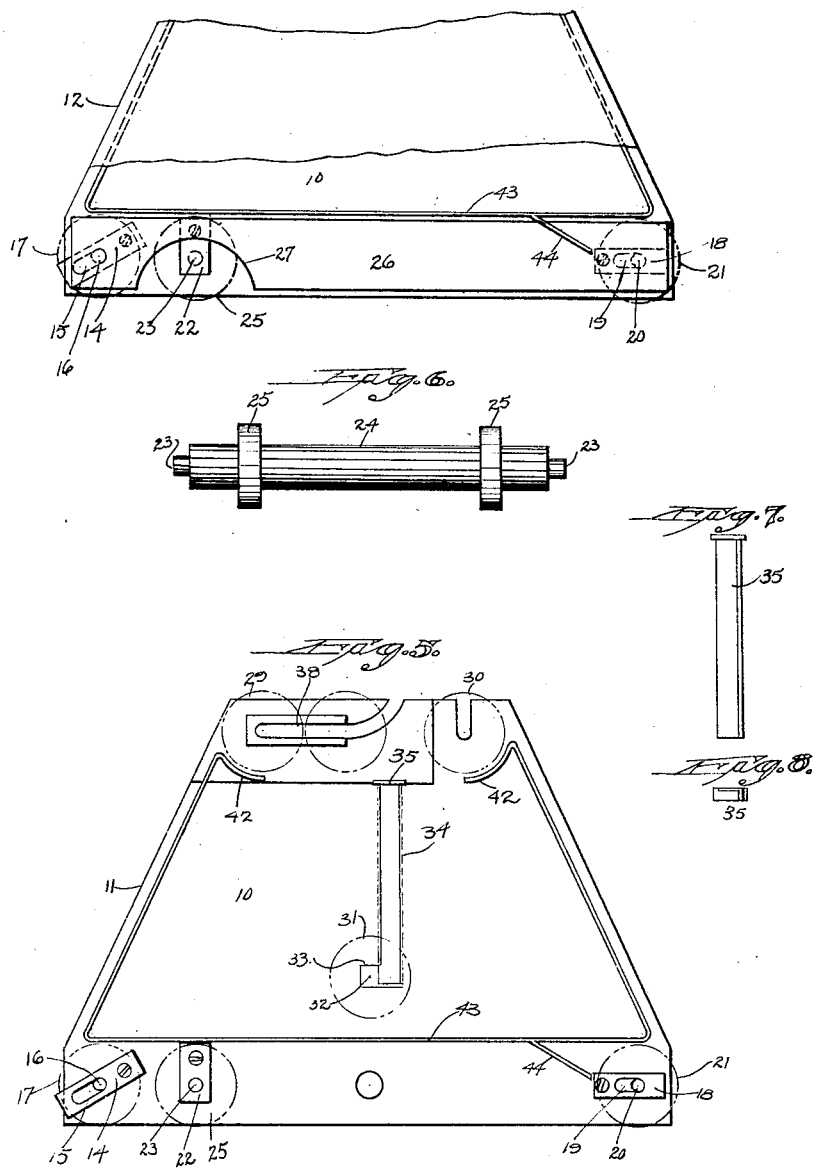

UNITED STATES PATENT OFFICE.

EDWIN C. PERKINS, OF NEW HAVEN, CONNECTICUT.

MOPPING-MACHINE.

1,364,516.     Specification of Letters Patent.     Patented Jan. 4, 1921.

Application filed April 26, 1919. Serial No. 292,908.

*To all whom it may concern:*

Be it known that I, EDWIN C. PERKINS, a citizen of the United States, residing at New Haven, in the county of New Haven and State of Connecticut, have invented a new and useful Improvement in Mopping-Machines; and I do hereby declare the following, when taken in connection with the accompanying drawings and the characters of reference marked thereon, to be a full, clear, and exact description of the same, and which said drawings constitute part of this application, and represent, in—

Figure 1 a side view of a mopping machine constructed in accordance with my invention.

Fig. 2 a top or plan view with the belt removed.

Fig. 3 a front end view of the lower part of the machine with the belt removed.

Fig. 4 a broken side view showing the flange at the right hand side of the machine with bearings for the rollers, and connections between the front and rear rollers, the rollers being shown in broken lines.

Fig. 5 an inside view of the right hand wall, the several rollers being shown in broken lines.

Fig. 6 a face view of the bearing shaft removed.

Fig. 7 a plan view of the locking key detached.

Fig. 8 an end view of the same.

This invention relates to an improvement in mopping machines, the object being to provide a device simple in construction and effective in action, and in which the water is spread upon the floor when moved in one direction and wiped up when moved in the opposite direction. While the device is particularly adapted for use with water as a mop, the device might be used for oiling or waxing floors or for similar devices, and by the term "mop" I wish to be understood as including the general term of floor cleaning or polishing machines; and the invention consists in certain details of construction as will be hereinafter described and particularly recited in the claims.

In carrying out my invention, I employ a container 10 for water or other suitable material, the side walls or flanges 11 and 12 of which are offset and extend downward and to the inner faces near the forward end are blocks 14 with inclined slots 15 for the reception of the axle 16 of a forward roller 17. To the inner faces of the flanges at the rear end are blocks 18 formed with horizontal slots 19 for the reception of the axle 20 of a rear roller 21. The flanges are also provided near their forward ends with bearings 22 for the axle 23 of a bearing shaft 24 which is provided with narrow bearing-rings 25. The axles 16 and 20 extend through connecting bars 26 so that the front and rear rollers 17 and 21 move together, this bearing being cut away as at 27 to clear the shaft 24. An endless belt 28 passes over the rollers 17 and 21 over idler rollers 29 and 30 mounted in the upper side walls of the container and around a roller 31, the axle 32 of which enters a horizontal bearing 33 formed at the lower end of channels 34 in the side walls of the container and which may be closed by keys 35. Parallel and closely adjacent to the roller 29 is a compression roller 36 the axle 37 of which extends through slots 38 formed for it in the side walls, and on the ends of the axle are caps 39 connected by springs 40 with the case, the tendency of the springs being to crowd the roller 36 against the portion of the belt passing over the roller 29 so as to wring the belt. The front and rear walls of the casing are turned inward at their upper ends to form drip lips 41 and 42, and secured to the bottom 43 of the container and extending rearwardly toward the roller 21 is a friction plate 44 against which the roller 21 may move. A handle yoke 45 has its ends engaged with the sides of the container and this yoke is provided with a suitable handle 46 by which the device may be moved back and forth. The container is filled with water or other material which may be removed through an opening in the bottom of the container which may be closed by the plug 47. In the forward movement of the container the rolls 17 and 21 move rearward so that the belt runs freely in this direction and spreads water or other material upon the floor, the belt being squeezed as it emerges from the container between the rolls 36 and 29. In this forward movement the weight of the container comes upon the bearing rings 25 so that the belt is comparatively free to spread the water upon the floor. On the rearward movement of the device, however, the roll 21 comes in engagement with the friction plate 44 and is held against rotation, this roll being covered with rubber or other suitable material for the purpose of making a firm engagement with the friction plate. As the belt is thus held against movement the rearward movement of the container draws the belt over the floor and thus removes the moisture spread by the forward movement. Thus at each forward movement a supply of cleaning or other material is spread upon the floor and in the rearward movement it is wiped up by the belt. In the forward movement of the device as before stated, the roll 17 moves rearwardly and owing to the inclination of the bearing it is lifted away from the floor so as to permit the belt to run freely and distribute the water upon the floor, the belt being depressed by the rings 25 on the shaft 24.

I claim:—

1. A mopping machine comprising a container, front and rear rollers connected together and slidably mounted at the bottom of the container, a friction plate adjacent to the rear roller, rollers arranged at the top of the container, a roller arranged within the container over which rollers the belt passes, and a compression roller arranged adjacent to one of the rollers at the top of the container.

2. A mopping machine comprising a container and including a series of rollers, an endless belt passing over said rollers, one of the rollers mounted below the container at the forward end in inclined slots forming bearings, and another below the container at the rear end in horizontal slots forming bearings, said bottom rollers connected to move together.

3. A mopping machine comprising a container and including a series of rollers, an endless belt passing over said rollers, one of the rollers mounted below the container at the forward end, and another below the container at the rear end, and the bearings for the forward roller each having a slot arranged at an angle to its path of movement, and the two bottom rollers connected to move together.

4. A mopping machine comprising a casing formed at its sides with depending flanges, bearings secured to the inner walls of said flanges, the bearings at the forward end having inclined slots, and the bearings at the rear end horizontally slotted, rollers mounted in said bearings, and connections between the rollers whereby they move together, rollers mounted at the top of the container, a roller mounted within the container near the bottom thereof, means for locking this last named roller in place, a belt passing over said rollers, and a compression roller arranged parallel with, and adjacent to the forward top roller.

5. A mopping machine comprising a container and including a series of rollers, an endless belt passing over said rollers, one of the rollers mounted below the container at the forward end, and another below the container at the rear end, and the bearings for the forward roller each being a slot arranged at an angle to the path of movement of the roller, the two bottom rollers connected to move together, and a bearing shaft between the bottom rollers and formed with bearing rings.

In testimony whereof, I have signed this specification in the presence of two subscribing witnesses.

EDWIN C. PERKINS.

Witnesses:
    FREDERIC C. EARLE,
    C. L. WEED.